Figure 1:
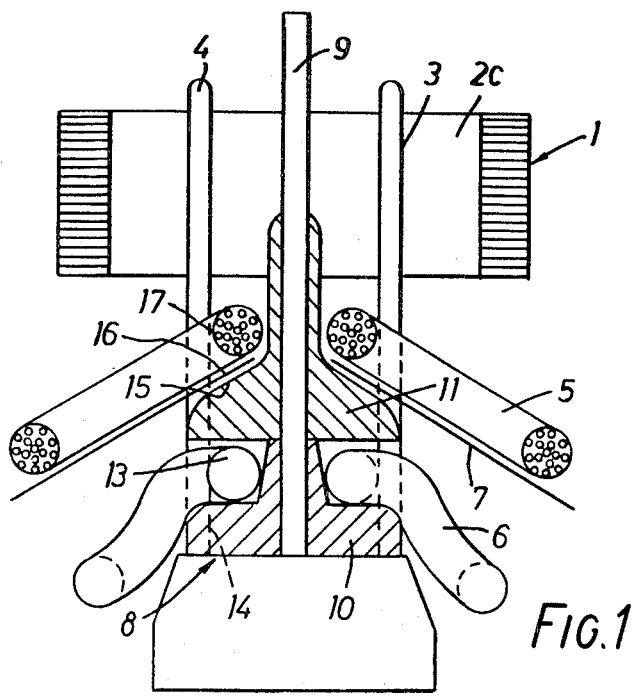

United States Patent [19]

Lund

[11] 3,885,288

[45] May 27, 1975

[54] METHOD OF DRAWING IN THE STATOR WINDING OF AN ELECTRIC MOTOR

[75] Inventor: Egon Lund, Sonderborg, Denmark

[73] Assignee: Danfoss A/S, Nordborg, Denmark

[22] Filed: Aug. 30, 1974

[21] Appl. No.: 501,880

Related U.S. Application Data

[62] Division of Ser. No. 415,120, Nov. 12, 1973, Pat. No. 3,857,171.

[30] Foreign Application Priority Data

Nov. 11, 1972 Germany............................ 2255345

[52] U.S. Cl.................... 29/205 D; 29/596; 29/606
[51] Int. Cl. .......................................... H02k 15/02

[58] Field of Search .......... 29/205 R, 205 D, 205 E, 29/596, 606; 310/42

[56] References Cited

UNITED STATES PATENTS

| 3,402,462 | 9/1968 | Walker et al. ........................ 29/596 |
| 3,722,063 | 3/1973 | Arnold .............................. 29/205 R |
| 3,742,596 | 7/1973 | Smith et al. .................... 29/205 R X |

Primary Examiner—Carl E. Hall

[57] ABSTRACT

Apparatus for drawing in the stator winding of an electric motor wherein strands from two different coils are superposed in at least some of the stator grooves.

3 Claims, 5 Drawing Figures

METHOD OF DRAWING IN THE STATOR WINDING OF AN ELECTRIC MOTOR

This is a divisional application of U.S. patent application Ser. No. 415,120 Filed Nov. 12, 1973, now U.S. Pat. No. 3,857,171.

The invention relates to a method of drawing in examples stator winding of an electric motor in which winding strands from two different coils are superposed in at least some of the grooves and their end windings are separated by insulating foils which are connected in pairs to insulating inserts by means of insulating strips likewise fitted in grooves, the coils being arranged on pins which extend between the grooves at the inner periphery of the stator, and thereafter the head portions of the coils disposed within the inner periphery are moved through the stator by means of axial forces applied at an end face, and the adjacent coil parts are at the same time held at a diameter which is at least equal to the inside diameter of the stator, the invention also relating to an electric motor produced by this method and finally to an apparatus for carrying out the method and producing the electric motor.

Apparatus is known for drawing in the stator winding of an electric motor and including a ring of pins the outside periphery of which corresponds to the inside periphery of the stator. The outer surface of each of the axially parallel pins is adapted to cover completely the crest of the tooth between two adjacent grooves. The apparatus also includes an insertion head which matches the inside periphery of the stator, has at its edge recesses for the pins, and has an end face formed as a pressure surface. When coils are fitted on the pins and the stator is pushed on to the ring of pins, the insertion head can be pressed through the stator. When this happens, the pressure surface of the insertion head applies axial forces to the end faces of the head portions of the coils disposed within the inside periphery of the stator. At the same time the periphery of the insertion head maintains the adjacent portions of the coil at a diameter equal to the inside diameter of the stator. This results in the winding strands being drawn into the associated grooves. The pins project only slightly beyond the stator. As soon as the inner end windings are freed from the pins, they are pressed outwards by the insertion head.

If an asynchronous motor with a main winding and an auxiliary winding was to be produced, it was first necessary to draw in one of the windings, e.g. the main winding, in the manner described. The stator was then removed and two insulating inserts, forming the head insulating foils, together with the insulating strips were placed by hand in the corresponding grooves. Then the partially wound stator had to be mounted on an inserting device again so that the second winding, e.g. the auxiliary winding, could be drawn in, individual strands being introduced into grooves already containing a winding strand. Similar steps had to be carried out in the case of three-phase motors in which winding strands from two different coils likewise extend in one groove.

It is also known practice to arrange the main winding and the auxiliary winding together on the pins and then to draw them into the grooves with the aid of the inserting head. In this system, the axial compressive forces are applied directly to the first layer of the coil and transmitted by this to the second layer of the coil. In this procedure however it has not been possible to provide an insulating insert between the coils. This method is therefore only suitable when the coil-head insulation can be dispensed with, e.g. in the case of low-voltage motors.

The object of the invention is to provide a method of the initially described kind whereby it is possible to draw in not only at least two coil layers in a single operation but also a coil-head insulation.

According to the invention, this object is achieved by arranging all the coils, with the insulating inserts interposed, in at least two layers on the pins in such manner that on the one hand winding strands in the same groove and from different coils and, on the other hand, insulating strips and in each case at least one winding strand are superposed, and by applying the axial forces not only at an end face to the head end of the coils of the first layer, but also on the end-winding insulating foils disposed within the inner periphery of the stator.

When this procedure is used, the insulating insert is draw into the grooves in the same way as the coils. On account of the different materials the insulating insert of course behaves differently from the coils when it is drawn in. Therefore, if an insulating insert is placed between two coil layers and the axial forces are applied only at the end face to the first layer, damage occurs to the insulating insert. If on the other hand the axial forces are applied without interposing the first coil layer which deforms when drawn in, but are caused to act directly on the insulating insert, specific conditions are created whereby the inserts can be drawn in without damage.

When this procedure is used, the second coil layer is also acted upon practically directly by the axial forces. Thus better conditions than previously are likewise created for drawing in this layer. In particular the coils of the second layer can be drawn in without damage since the forces do not have to be transmitted through the parts of the first layer that deform during the drawing-in operation.

An electric motor produced by this method is thus characterized in that at least three insulating inserts are distributed over the periphery of the stator. For a double-pole asynchronous motor having a main and auxiliary phase, four inserts are expediently used. The smaller the portion of the periphery over which the insulating insert extends the simpler does it become for the insert to participate in the deformation occurring during the drawing-in operation.

It is particularly advantageous if each insulating insert has three insulating strips. The two outer insulating strips result in the insert having a coil-like shape. The median insulating strip so stiffens the insert that it does not deform, e.g., in the diagonal direction, during drawing in.

In this arrangement, the first insulating strip can be disposed beneath a winding strand of a first coil, the second insulating strip between a winding strand of the first coil and a winding strand of a second coil, and the third insulating strip above, a winding strand of the second coil. The second insulating strip then also provides intermediate insulation in the grooves between winding strands of different coils and in the same groove.

Furthermore, the insulating strips should be of a greater width than the groove-inlet gap and should be bent to a V-shaped cross-section. In this way the insulating strips acquire a sufficiently great width for taking up the tensile forces occurring during the operation of drawing in. The V-shaped cross-section on the one hand provides a certain rigidity and on the other facilitates insertion into the groove-inlet gaps.

Furthermore, the head-insulating foils preferably project towards the stator in curved form between the insulating strips. These projecting curved portions provide a reinforcement whereby the head insulating foils can bear against the pins during the drawing-in operation.

According to the invention, an apparatus for carrying out the method and for producing the electric motor and having an inserting head which matches the inner periphery of the stator, has at its edge recesses for the pins and has an end face designed as a pressure surface, is characterized in that the inserting head has two axially offset pressure surfaces. One of the pressure surfaces acts in the normal manner on the end face of the end windings on the first layer. The pressure surface acts on the head-insulating foils.

In a preferred embodiment the second pressure surface, which can be inserted first in the stator, is of conical form. This conical surface facilitates the drawing of the insulating insert into the stator without excessively great deformation.

A very simple construction results if the axially offset pressure surfaces occupy contiguous portions of the periphery of the insertion head. A practically one-piece insertion head then suffices.

Figure 2:
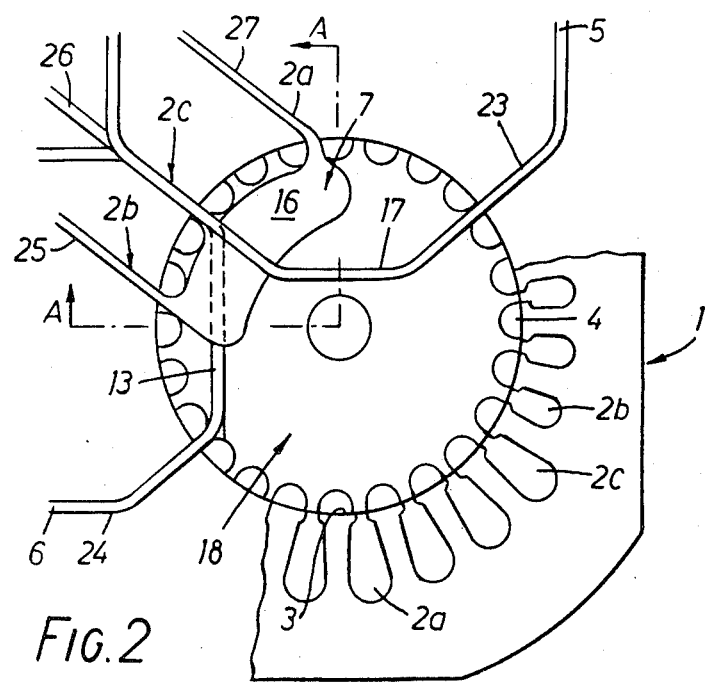
Figure 3:
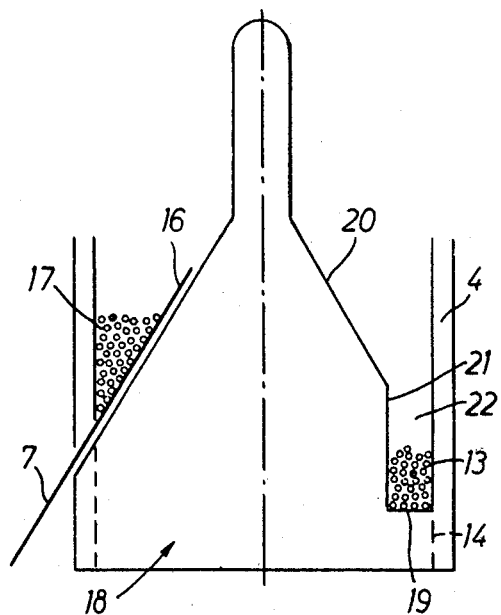
Figure 4:
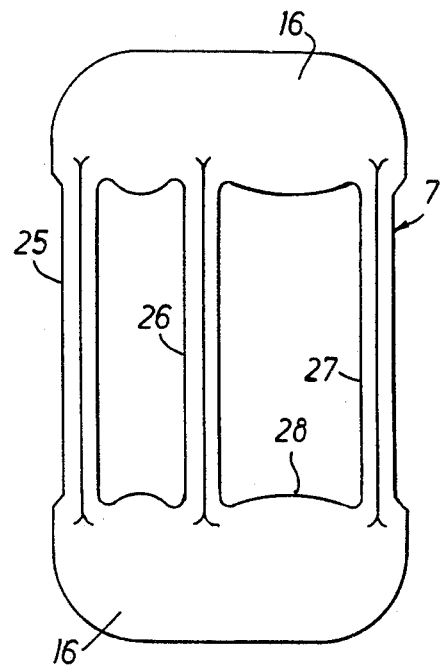
Figure 5:
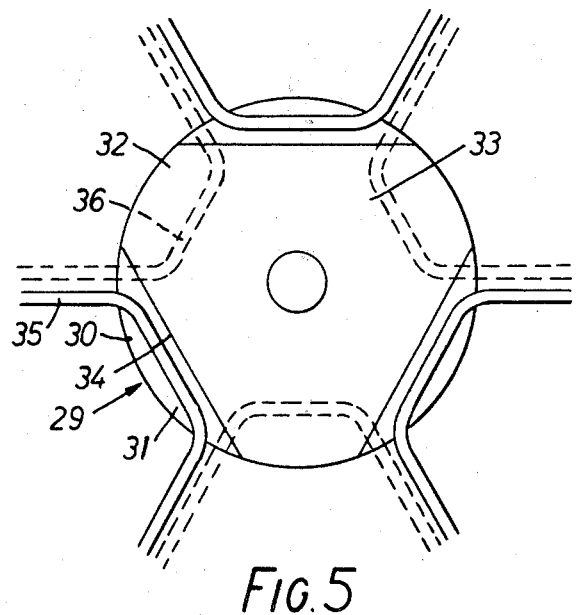

The invention will now be described by reference to examples of construction illustrated in the annexed drawing, in which:

FIG. 1 is a diagrammatic longitudinal section through an apparatus in accordance with the invention, FIG. 2 is a diagrammatic plan view of part of a modified form of construction, FIG. 3 is a longitudinal section through the insertion head on line A—A of FIG. 2, FIG. 4 is a plan view of an insulating insert, and FIG. 5 is a plan view of an insertion head for a double-pole multi-phase winding.

A stator 1 with grooves 2 is illustrated in FIG. 1. A ring of pins 4 is disposed at the inner periphery 3 of the stator. Each pin covers the head of a groove as can be seen from FIG. 2. Two main windings 5 and two auxiliary windings 6 are to be fitted in these grooves 2, and an insulating insert 7 is to be introduced between the windings. Strands of the main winding 5 are laid in larger grooves 2a and strands of the auxiliary winding 6 in smaller grooves 2b. A strand of the main winding and a strand of the auxiliary winding are laid one above the other in a groove 2c. The section illustrated in FIG. 1 is through the zone where this groove 2c is located.

An insertion head 8 consists of two portions 10 and 11 displaceable on a rod 9. The portion 10 has at its end face a pressure suface 12 by which it bears against the end face of the head portion 13 of the auxiliary winding 6 disposed within the periphery 3 of the stator. The outer periphery of the portion 10 corresponds to the inner periphery 3 of the stator. Corresponding grooves 14 are provided for the pins. The second portion 11 has a conical pressure surface 15 on which lies the head-insulating foil 16 of the insert 7, which foil is located within the periphery 3 of the stator. Above the insert is the inner head portion 17 of the main winding 5. The portion 11 of the insertion head also has a periphery similar to the inner periphery 3 of the stator, and grooves 14 for accomodating the pins 9.

When the two portions 10 and 11 of the insertion head 8 are pushed simultaneously or successively through the stator 1, the head portions 13 and 17 of the windings 5 and 6, and the head insulating foil 16 are moved upwards. They cannot however deflect outwardly because of the presence of the pins 4. The adjoining portions of the coils and of the insulating insert are kept by the outside periphery of the portions 10 and 11 of the inserting head to a circumference which is greater than the inside periphery 3 of the stator. Consequently the individual portions are drawn into the grooves 2. When the individual head portions are freed from the pins 4 they are likewise pressed outwards by the portions 10 and 11 of the insertion head, the head-insulating foils 16 lying between the ends of the windings 5 and 6 that are being formed. Then the coils and in particular the end windings are brought to the required final form by simple means.

FIGS. 2 and 3 illustrate a modified insertion head 18 the periphery of which again matches the periphery 3 of the stator and has grooves 14 for the pins 4. Here a first pressure surface 19 and a conical second pressure surface 20 are provided. The pressure surface 19 is created by removing parts from a conical body 20 along secants 21 so that recesses 22 are formed. The head portion 13 of coils of the auxiliary winding 6 are again mounted on the pressure surface 1, the head-insulating foil 16 of the insulating insert 7 on the pressure surface 20, and above this, the head portion 17 of the coils of the main winding 5.

FIG. 2 shows in greater detail how each outermost strand of the coils 23 of the main winding 5 and of the coils 24 of the auxiliary winding 6 are arranged on the pins, the strands overlapping at the groove 2c. Eight winding strands are associated with each coil of the main winding and six winding strands with each coil of the auxiliary winding. The insulating insert 7 is fitted between the two coils 23 and 24.

This insulating insert 7 has the shape illustrated in FIG. 4. It consists of two head insulating foils 16 which are interconnected by three insulating strips 25, 26 and 27 which are bent in the longitudinal direction and therefore have a V-shaped cross-section. The insulating strip 25 is laid in a groove 2b above the winding strand. The insulating strip 26 is laid in a groove 2c between two winding strands. The insulating strip 27 is laid in a groove 2a below a winding strand. The head-insulating foils 16 each have a curved portion 28 which projects between the insulating strips. Each of these curved portions is applied to the pins during the drawing in operation and forms a reinforcement. Four such insulating inserts 7 are required for the motor shown in FIG. 2. In this form of construction, the foil consists of a 0.19 mm thick polyester film.

FIG. 5 illustrates a further insertion head 29, this time for a doublepole three-phase motor. The first pressure surface 30 is formed by recesses 31 which are provided in a conical surface 33 forming the second pressure surface 32. The recesses are each bounded by the secants 34 offset from each other by 120°. A first layer of coils 35 lies on the pressure surface 30, and a second layer of coils 36, shown in broken lines, lies on the pressure surface 32. The insulating inserts 7 are not shown in this Figure.

It is obvious that this arrangement can be used for windings having more than two layers of coils, that it is also suitable for four-pole and multipole motors, and that it is possible to place one strand of a coil in the lower portion of a first groove, and the second strand of the coil in the upper portion of a second groove.

What is claimed is:

1. Apparatus for inserting stator windings into grooves in a stator of an electric motor, the apparatus comprising a ring of pins the outside periphery of which corresponds to the inside periphery of the stator, an insertion head the outer periphery of which corresponds to the inside periphery of the stator, means mounting said insertion head for movement towards and away from the stator, recesses in said insertion head for engagement with said pins to guide said insertion head during said movement, and first and second pressure surfaces on said insertion head for applying pressure to respective ones of said windings to effect insertion of said windings into said grooves while at the same time said windings are guided by said pins, said two pressure surfaces being axially offset in the direction of said movement.

2. Apparatus according to claim 1 wherein said second pressure surface is disposed so as to first enter the stator during said movement and is of conical shape.

3. Apparatus according to claim 2 wherein said pressure surfaces occupy contiguous portions of the periphery of said insertion head.

* * * * *